United States Patent [19]

Brooks

[11] Patent Number: 5,176,409
[45] Date of Patent: Jan. 5, 1993

[54] HIGH PRESSURE PIPE COUPLING

[75] Inventor: Robert T. Brooks, Aberdeen, Scotland

[73] Assignee: Dixie Iron Works, Alice, Tex.

[21] Appl. No.: 669,983

[22] Filed: Mar. 15, 1991

Related U.S. Application Data

[63] Continuation of Ser. No. 635,568, Nov. 11, 1989, abandoned.

[51] Int. Cl.$^5$ .............................................. F16L 7/00
[52] U.S. Cl. ....................................... 285/94; 285/90; 285/334.4; 285/341; 285/351; 285/353; 285/354; 285/388; 285/917
[58] Field of Search ................. 285/94, 336, 353, 917, 285/354, 334.4, 334.2, 281, 341, 90, 351, 388; 277/235

[56] References Cited

U.S. PATENT DOCUMENTS

| | | | |
|---|---|---|---|
| 2,863,679 | 12/1958 | Dunbar | 285/336 |
| 3,628,812 | 12/1971 | Lorralde et al. | 285/334.2 X |
| 4,221,408 | 9/1980 | Lochte et al. | 285/276 |

OTHER PUBLICATIONS

1979 API Specification for Wellhead Equipment, pp. 25, 40.
Grayloc Products Catalog, pp. 6, 23.
Weco Original Wing Unions, Catalog WU-8, pp. 4,5.
Dynetor Connectors Catalog, pp. 4,5.
Nicholson Seals Ltd., Catalog for S1909 Flange Groove Gasket.
Nicholson "Ellipseal", Self Energizing Seal.
Cameron Collet Connectors, p. 683 (enlargement page 683) p. 685, (enlargement page 685), enlargement of Figure 1.

Primary Examiner—Dave W. Arola
Attorney, Agent, or Firm—Donald H. Fidler

[57] ABSTRACT

A coupling device for metal tubular members subjected to pressure where abutting coupling members define a V shaped groove. A metal annular V shaped sealing member constructed from resilient metal is disposed in the V shaped groove and arranged so that the sealing member has sealing edge portions which can expand longitudinally and radially to maintain a seal if the coupling members tend to separate or contract in response to pressure.

19 Claims, 2 Drawing Sheets

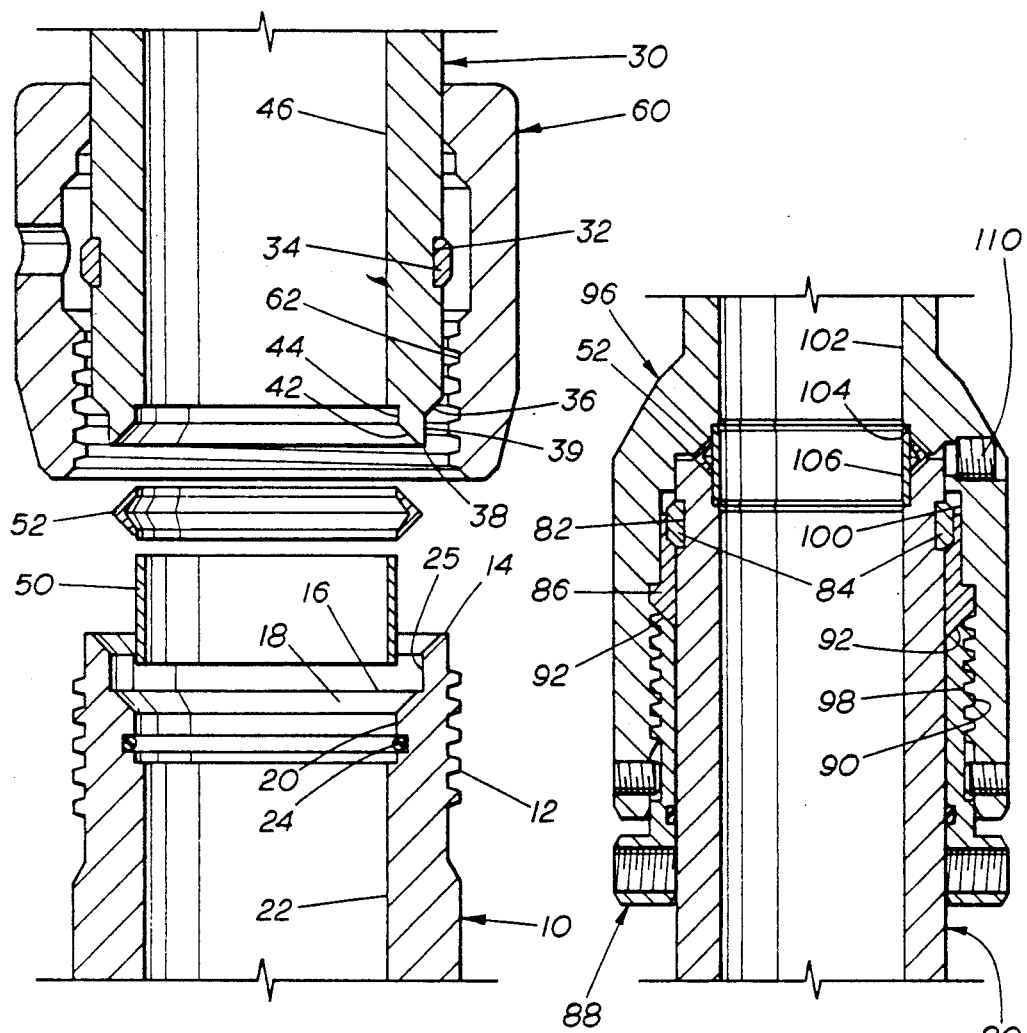
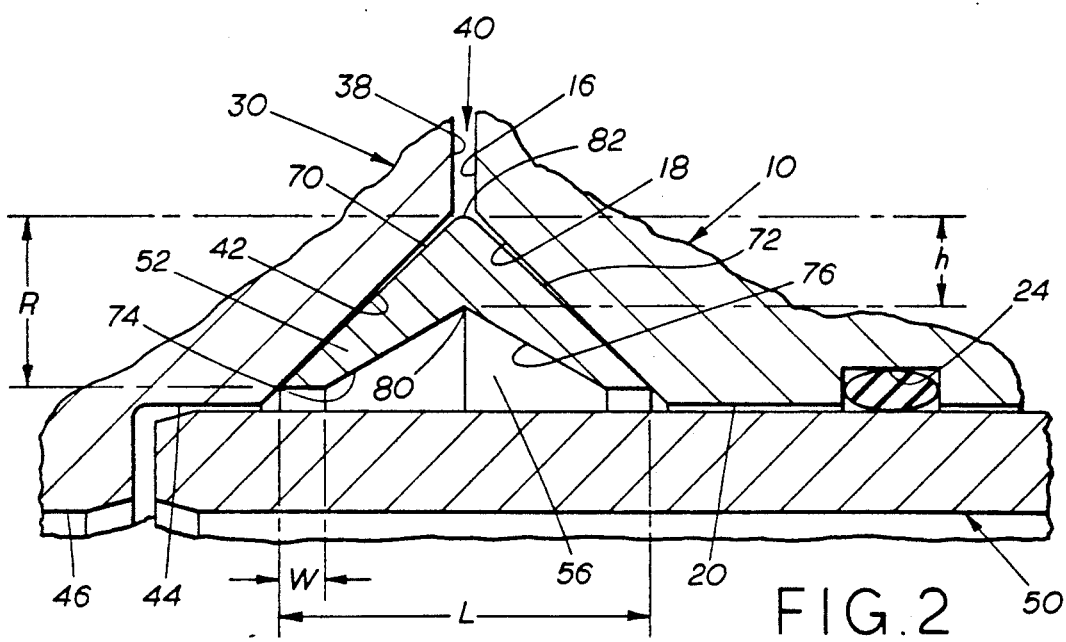

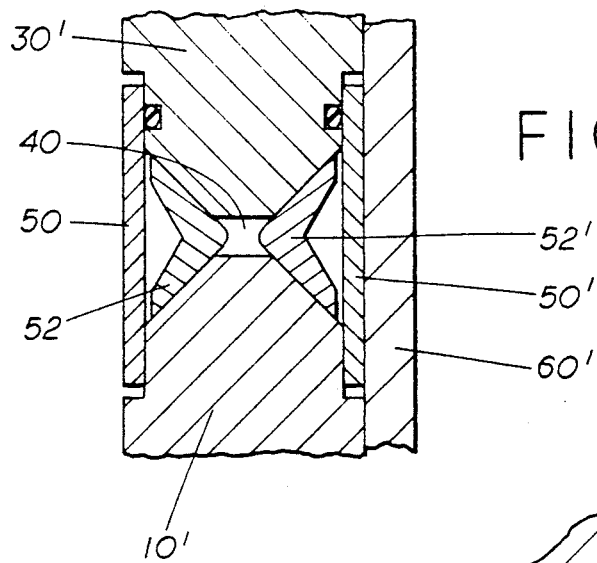
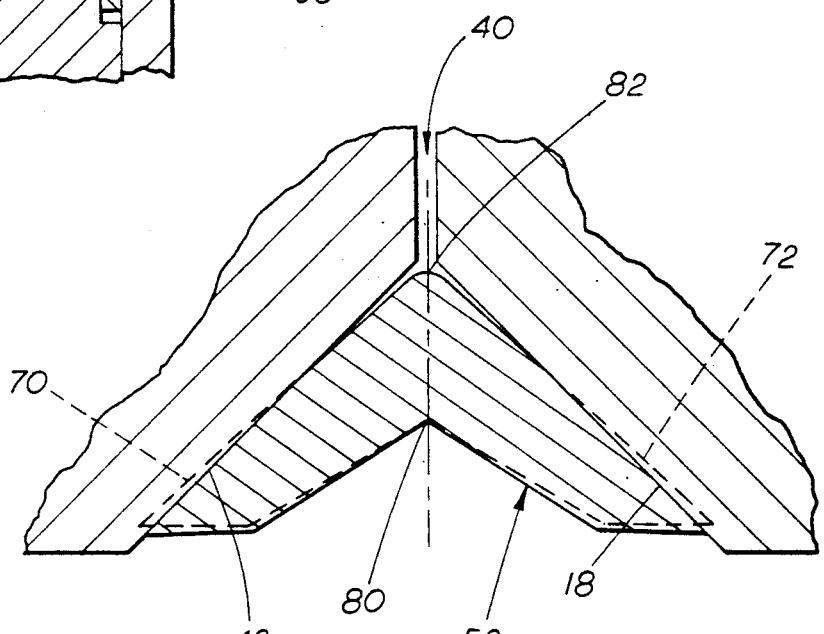
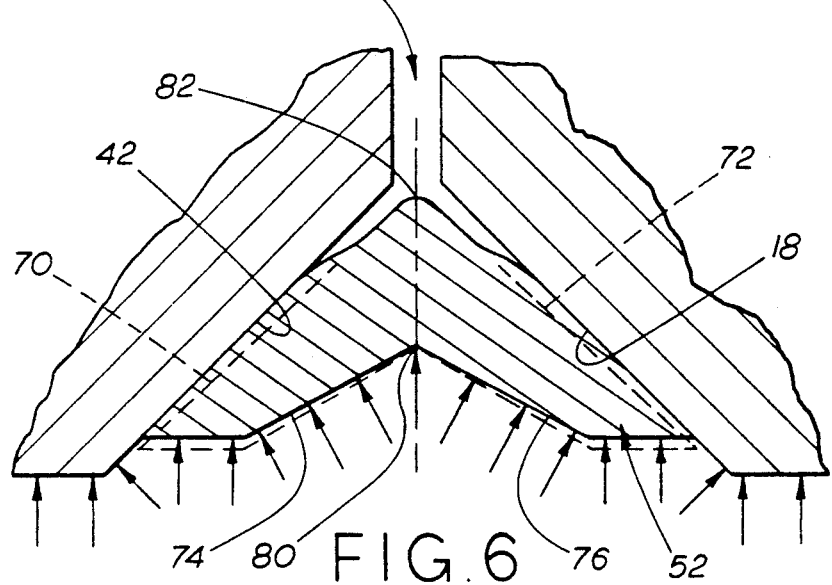

HIGH PRESSURE PIPE COUPLING

This is a continuation of co-pending application Ser. No. 635,568 filed on Nov. 11, 1989, and now abandoned.

FIELD OF THE INVENTION

This invention relates to pipe connector or coupling devices, and more particularly to metal-to-metal sealing connectors for high pressure applications where the connectors can be utilized with corrosive liquids and are capable of sealing under both static and dynamic connector conditions.

BACKGROUND OF THE INVENTION

In oil field and other high pressure applications, tubular pipes are connected to one another by pipe couplers or connectors where the connectors utilize a metal-to-metal contact seal for preventing fluid leakage from the interior of the coupling. A metal-to-metal seal in a coupling is principally dependent on the preloading of a sealing member in the coupling to get a tight seal and to prevent leakage when an internal pipe or coupler pressure induces longitudinal stress in the coupling members.

Metal-to-metal seals currently in use are:

1) the API flange—this is a widely used coupling for high pressure fluids and involves a face-to-face coupling of flanges with an interposed metal sealing member between the flanges. The metal sealing member is usually a flat faced seal that is crushed between the two flat faced hubs on the flanges, 2) a "Grayloc" type connector—this connector is comprised of facing metal seal ring hubs and an annular clamp assembly. A internal metal sealing ring resembling an inverted "T" in cross section is disposed between the hubs. The clamp assembly fits over the outer annular surface of the two facing hubs and is forced radially inward by making up the clamp bolts to draw the facing hubs together and to compress with the sealing ring rib between the hub surfaces. As the hubs are drawn together by the clamp assembly, the internal seal ring lips engage and deflect against the inner sealing surfaces on the hubs. The deflection of the seal ring lips elastically preloads the lips of the seal ring against the inner sealing surfaces of the hubs thereby forming a preloaded seal. In use, internal pressure acts on the seal ring lips so that the sealing action of the lips is both preloaded and pressure-energized. However, if the internal pressure becomes sufficiently great to cause the facing hubs to be displaced or moved longitudinally of one another, the seal ring lips will lose their sealing ability because the preloading sealing compression between the hubs and the seal is lost. Also the metal seal ring has a 20° (sometimes 25°) bevel so that the seal lips do not radially compensate for movement of the seal lips when the hubs are spread apart from one another.

3) A "Weco" wing union—this coupler has metal-to-metal compression seals disposed between connector surfaces and uses a lip type elastomer replaceable seal to protect the metal primary seal.

4) A "dynetor" connector—this is a metal-to-metal connector coupling with a reusable annular metal seal. The annular metal seal has cylindrical ends so that some longitudinal expansion or spreading between the coupling parts can occur without losing the seal in the annular seal bores.

5) The Nicholson flange—this is an annular shaped gasket which is used between flanges and flange grooves. The flange seal, when compressed between flanges, will expand with longitudinal movement but the seal will fail because the gasket expands longitudinally and thus will fail at the gap.

6) The Nicholson lip C seal—this is a seal which depends upon point contact for sealing and is a round seal.

7) The Cameron AX or CX gasket illustrated in the 1988-89 Composite Catalog, pgs 683, 685 and 826. The AX and CX gasket is a tubular member which has an external taper on each end and sealing means which engage tapered surfaces in adjoining connectors.

THE PRESENT INVENTION

The present invention is embodied in a pipe coupling in which first and second tubular coupling members are connected to one another usually by a threaded nut member. The pipe coupling members have facing internal frusto conical surfaces which form an internal annular V shaped sealing groove where the groove surfaces have approximately a 45° bevel or angle with respect to a central axis of the coupling members and a gap spacing between transverse facing surfaces on said coupling members. An annular metal sealing ring member constructed of resilient material is V shaped in cross section with its dimensional configuration arranged so that in a relaxed condition, the apex of the outer surfaces of the V shaped sealing ring member is spaced from an apex for the V shaped sealing groove while the outer edge surfaces of the V shaped sealing ring member engages the frusto conical surfaces of the V shaped sealing groove. When the coupling members are coupled to one another the outer surfaces of the V shaped sealing ring member are brought into engagement with the surfaces of the V shaped sealing groove. This movement of the sealing ring member flexes the "wings" of the sealing ring member and provides a sealing force in the outer edge surfaces of the V shaped sealing ring member.

Each of the coupling members has a counterbore or cylindrical recess in the central bore so that a tubular retainer ring can be inserted in the counterbores between the sealing ring member and the V shaped sealing groove. The V shaped annular sealing ring member is designed with an overall transverse width approximately twice as great as the thickness of the sealing member between the apex of the outer surfaces and the apex of the inner surfaces of the sealing ring member.

If the internal pressure in the coupling causes the coupling members to move longitudinally relative to one another or try to move longitudinally apart, the outer edge surfaces of the V shaped sealing ring member will expand radially and the outer edge surfaces will expand axially because of the flexing of the "wings" of the sealing ring member. Thus, axial movement of the sealing groove surfaces of the coupling members is taken up by the outer edge surfaces of the sealing ring member moving radially outwardly and moving axially to offset a longitudinal spacing gap between the coupling members caused by internal pressure. If the internal pressure thereafter decreases and the spacing gap between the coupling members begins to decrease, the outer edge surface of the sealing ring member will contract radially inwardly due to elasticity of the sealing ring material and the compression force induced by the coupling members moving back together.

Because the sealing ring member is made of metal it is ideally suited for corrosive fluid environments as there are no elastomers subject to chemical attack and because the sealing ring burnishes, the sealing groove surfaces of the coupling member, and the seal lips of the sealing ring member are flexible or resilient. There are no grooves nor entrapping seal profiles for corrosive fluids to remain in the connector to cause corrosion.

In the sealing ring member, the leading or base edges of the sealing ring member are the initial sealing points on the V shaped groove surfaces. The dissimilar angles between the sealing ring member with respect to the V shaped groove surfaces in the connector members insures that an initial preload can be applied to the sealing points of the seal ring member in assembly with only a nominal amount of torque applied to the coupling nut member. Thus, the coupling will be sealed at low pressures. The internal sleeve in the counterbore isolates the sealing ring member and insures a smooth straight bore through the assembled connector.

The sealing ring member can be used internally or externally or in a combination internal/external arrangement for sealing against external or internal pressure differentials.

The shape of sealing ring member allows for misalignment of the coupling members during assembly. The internal sleeve protects the V sealing member from damage during assembly and disassembly especially during a stabbing operation for joining the coupling members to one another. When the coupling is disassembled, the design of the V sealing member allows it to spring back to its original shape due to its elasticity within its range of resiliency and it can be reused.

The sealing member is ideal for applications where rotational motions or movements may be involved. Since the sealing ring member flexes during relative rotational movement with changes in internal pressure, alignment or eccentricity, the pressure seal is constantly maintained.

DESCRIPTION OF THE DRAWINGS

FIG. 1 is a view in longitudinal cross section through a coupling member and illustrates the components in disassembled positions;

FIG. 2 is a view in partial cross section through the sealing member sealing position;

FIG. 3 is a view in longitudinal cross section through a coupling member which is adapted to accommodate a relative turning movement;

FIG. 4 is a view in partial cross section of another form of the present invention;

FIG. 5 is an enlarged partial view in cross section through a sealing member after preloading; and FIG. 6 is an enlarged partial view in cross section after preloading and with applied internal pressure.

DESCRIPTION OF THE PRESENT INVENTION

The present invention relates to connectors or couplings for pipes typically in the range of sizes from one to six inch diameters to meet ANSI pipe schedules, API bore sizes and other industry standards. The connector or coupling is capable of maintaining seal integrity of working pressures up to 20,000 p.s.i.

A static connector or coupling embodying the present invention is illustrated in FIG. 1 wherein a first connector part or coupling member 10 on a metal tubular pipe member has an external acme thread 12. The terminal end of the coupling member 10 has a first outer frusto conical surface 14. The conical surface 14 adjoins a cylindrical surface 25. The cylindrical surface 25 adjoins a transverse annular surface 16. The transverse surface 16 adjoins a second inner frusto conical surface 18. The frusto conical surface 18, in turn, adjoins a cylindrical surface 20 which is a counterbore to the main bore 22 of the coupling member 10. An annular o-ring groove 24 and o-ring is provided in the cylindrical surface 20.

The mating second connector part is a metal tubular coupling member 30 on a pipe member which has an annular groove 32 for receiving a C type locking ring 34. The end surface of the second connector member 30 is configured with a frusto conical outer surface 36 arranged complimentary to the first frusto conical surface 14 of the first connector member 10. A cylindrical surface 39 adjoins the frusto conical surface 36 and extends lo a transverse annular surface 38. When the frusto conical surface 14 is in engagement with the frusto conical surface 36 there is an expansion gap 40 defined between the surfaces 16,38. (See FIG. 2). This permits engagement of the frusto conical surfaces 18,36 while spacing the transverse surfaces from one another with an expansion gap 40 for purposes which will be explained hereinafter. The transverse surface 38 on the second connector member adjoins an inner frusto conical surface 42 where the frusto conical surface 42 extends to a counterbore 44 and the counterbore 44 adjoins the main bore 46 of the connector member 30. The inner frusto conical surface 42 of the second connector 30 and the inner frusto conical surface 18 of the first connector 10 define a "V" shaped sealing groove with an apex lying in the expansion gap 40. The surfaces of the sealing groove have an included angle of 90° therebetween. (See FIG. 2).

An annular metal sealing ring member 52 which is constructed from resilient metal (such as Inconel 718 which has a relatively low modulus of elasticity as compared to hardened carbon steel) is V shaped in cross section and is received within the V shaped sealing groove defined by the surfaces 18,42. A tubular retainer member 50 is disposed in the counterbores 20,44 to isolate the sealing ring member 52 from the bores 22,46 of the connector members 10,30. An o-ring seal 24 is located in a counterbore in one of the connector members to provide a retaining device with respect to the retainer member 50 so that a protected chamber 56 (from the flow path) is formed within the V shaped groove (see FIG. 2) where the V shaped groove defined by the opposed frusto conical surfaces 18,42 and the exterior surface of the retainer member 50.

A tubular nut 60 with matching internal acme threads 62 is adapted to couple the two connector parts 10,30 to one another. A C-ring 34 disposed in the annular groove 32 is utilized for a stop when the nut 60 threadedly couples the connector members to one another. The C-ring also limits the longitudinal travel of nut in the opposite direction when the nut is released from a coupling position. A side opening is provided in the nut for access to the C-ring for installation and removal of the nut 60 and the C-ring 34. While not illustrated, it is well within the skill of the art to utilize a double nut arrangement for coupling instead of a single nut arrangement as illustrated in the drawing.

Referring now to FIG. 2 which is an enlarged view of the sealing ring member and V shaped sealing groove construction, the annular sealing ring member 52 is shown in a position just prior to tightening of the nut 60 to firmly couple the connector members 10,30 to one another. In the relaxed position shown, the sealing ring member 52 is V shaped in cross section. The included angle between the outer inclined surfaces 70,72 of the sealing ring member 52 is preferably 94°. The included angle between the inner inclined surfaces 74,76 of the sealing ring member 52 is 120°. The angle of the internal V-surfaces 74,76 is 30° with respect to the axis of the sealing ring member. The angle between the axis for a tubular member and the frusto conical surface 18 or 42 is 45°. The width "W" of a cylindrical surface between the internal and external V-surfaces 70,74 or 72,76 is approximately one-half of the distance or height "h" between the apexes 80, 82 of the internal and external surfaces 74,76 and 70,72. The overall radial height dimension "R" between a cylindrical base surface and the outer apex 82 is approximately one-half of the distance or length "L" between the base points of the external V-surfaces 70,72.

When the wing nut 60 is torqued up to bring the frusto conical surfaces 14,36 into contact with one another, the spacing or gap 40 between transverse surfaces is approximately 0.010 to 0.012 inches. In moving the connector members 10,30 toward one another to bring the frusto conical surfaces into contact with one another, the annular base sections of the sealing ring member 52 are flexed inwardly with the lower edge surfaces sliding along the frusto conical surfaces 18,42 to provide a debris cleaning feature. (See FIG. 5 where the original unloaded shape of the sealing ring is shown in dashed line for reference.). The initial nut torque up of the connection can be hand tight and when torqued up the sealing ring member 52 its annular frusto conical surfaces 70,72 moved into contact with the V-groove surfaces 18,42. In this condition there is a preloading or flexing of the lips of sealing ring member 52 and the outer edges of the ring member 52 are flexed radially inwardly and moved longitudinally toward one another. The preloading of the ring member 52 provides a low pressure seal.

When a pressure differential occurs because of pressure within the pipe, (see FIG. 6 where the original unloaded shape of the sealing ring is shown in dashed line for reference) the internal pressure is accessed around the retainer ring 50 to act upon the internal V shaped surfaces 74,76 or the "wings" of the wings of the sealing ring member 52 causing the sealing ring member 52 to be urged radially outward as well as urging the edges of the sealing ring member longitudinally (at the base sections) because the gap 40 widens to a gap 40' as shown in FIG. 6. As the internal pressure is sufficient to cause the coupling members to move longitudinally away from one another and increase the initial spacing of the gap 40, the edge sealing surface of the sealing ring member 52 (at the base sections) will follow any longitudinal separation of the coupling members from one another due to pressure. The edge sealing surface will normally flex outwardly because they are preloaded. At the same time the edge sealing surfaces of the sealing ring member 52 will expand radially. Conversely, if an increased pressure causing a separation of the coupling members is relieved, then the edge sealing surfaces of the sealing ring member 52 (because of its inherent elasticity within the working range of resiliency and the compressive force induced by the surfaces 18,42 moving toward one another to their initial position) will contract radially and longitudinally towards its initial condition while the gap 40' between the coupling members returns towards its initial position. In this respect, the edge sealing surfaces of the sealing ring member 52 are dynamic members which compensate for the longitudinal separation of the coupling members and are resiliently returnable to their original position.

Referring now to FIG. 3, another important form of the invention is illustrated in which a dynamic coupling for dynamic applications is illustrated. Dynamic applications are those applications in which one coupling member may be rotatively displaced relative to the other coupling member while the bore of the pipe members contains fluid under pressure. The type of turning or rotation contemplated is principally that which may be encountered by relative movements of the pipe while the pipe members are moved.

In the coupling arrangement shown in FIG. 3, a first tubular coupling member 80 is provided with an end surface having a counterbore and a frusto conical surface and a transverse surface at one end arranged similarly to the surfaces 20,18 and 16 as defined with respect to FIG. 1. On the outer surface of the coupling member 80 is an annular groove 82 to receive a C-locking ring 84. An annular bearing ring and a journal bearing 86 is disposed on the outer surface of the coupling member 80 in a longitudinal location between the locking ring 84 and a tubular nut member 88. The nut member 88 has an external acme thread 90 on it. The nut member journal bearing 86 have frusto conical surfaces at a location 92 which are complimentary arranged for engagement to permit the coupling member 80 to be tightened to a female housing 96. The female housing 96 has an internal acme thread 98 and a recessed internal portion 100 extending outwardly from a central bore 102 and includes a counterbore 104 for a retainer ring 106. The frusto conical surfaces at the location 92 engage and define a transverse clearance surfaces between the female housing and the coupling member 80 similar to the gap 40 shown in FIG. 2. A pressure type grease fitting 110 may be utilized to inject lubricant into the joint.

The coupling device as shown in FIG. 3 can be used as a swivel joint because the bearing 86 permits rotation as well as induced preloading in the seal ring 52 and the sealing ring member 52 maintains a metal-to-metal seal.

Referring now to FIG. 4, end surfaces of end-to-end arranged coupling members 10' and 30' are connected to one another in a fixed relationship by a connector housing 60' so as to define an annular clearance gap 40 when the internal sealing ring member 52 and the external sealing ring member 52' are preloaded in the inner and outer V shaped grooves and retained in place by inner and outer tubular members 50,50'. With the construction of FIG. 4 a pipe coupling within a wellhead can withstand both internal and external pressure differentials. Also, if desired, a sole external ring sealing member 52' can be employed.

It will be apparent to those skilled in the art that various changes may be made in the invention without departing from the spirit and scope thereof and therefore the invention is not limited by that which is enclosed in the drawings and specifications but only as indicated in the appended claims.

I claim:

1. A coupling device for tubular pipe members subjected to internal pressure and relative rotation, said coupling device including:

first and second metal tubular coupling members arranged for an end-to-end facing relationship for providing adjoining frusto conical surfaces defining an internal V shaped groove and for defining spaced apart end surface portions at the apex of said V shaped groove as an expansion gap;

a resilient metal annular ring sealing member having a V shaped cross section defined between inner and outer V shaped surfaces and where said outer V shaped surface extends from an apex to outer edge surfaces at the end portions of the V shaped surface, said ring sealing member sized for receipt in said V shaped groove so that there is a V shaped spacing between said outer V shaped surface and said frusto conical surface in a relaxed condition of said ring sealing member and so that the outer edge surfaces of said ring sealing member engage said frusto conical surfaces in a preloaded and assembled condition of the coupling device whereby longitudinal movement of outer edge surfaces of said ring sealing member occurs in response to internal pressure in said coupling device;

a retainer member in the bores of said coupling members for enclosing said ring sealing member in said V shaped groove;

attaching means for attaching said coupling members to another with the outer edge portions of said ring sealing member in contact with said frusto conical surface and for preloading said ring sealing member between said coupling members, said attaching means enclosing bearing means disposed between said coupling members, said bearing means permitting relative rotation of said coupling members while said outer edge surface of said ring sealing members are preloaded.

2. The coupling device as set forth in claim 1 wherein one of said coupling members is sized to internally receive the end of the other of said coupling members and define an annular spacing therebetween, said bearing means being disposed in said annual spacing.

3. The coupling device as set forth in claim 2 and further including means for externally accessing lubricant to said bearing means.

4. The coupling device as set forth in claim 2 or 3 wherein said ring sealing member in a relaxed condition prior to preloading has an overall transverse dimension between the outer edge surfaces which is approximately twice the dimension for a radial distance extending between an outer edge surface to the outer apex of said ring sealing member.

5. The coupling device as set forth in claim 4 wherein the transverse width of a base section between the inner and outer V shaped surfaces of the ring sealing member in a relaxed condition prior to preloading is approximately one-half of the radial dimension between the inner and outer apexed of the inner and outer V shaped surfaces.

6. The coupling device as set forth in claim 5 wherein said coupling members have counterbores and said retainer member is a tubular member sized to provide a relatively continuous smooth bore through the coupling members.

7. The coupling device as set forth in claim 6 wherein seal means are disposed between one of the counterbores and said tubular member.

8. The coupling device as set forth in claim 7 and further including complementarily arranged frusto conical engaging surfaces on said end portions where the engagement of said frusto conical engaging surfaces defines location of said spaced apart surface portions and the expansion gap between said end portions.

9. A coupling device for tubular pipe members subjected to internal or external differential pressure, said coupling device including first and second metal tubular coupling members respectively with end portions arranged for a facing relationship where said end portions respectively have adjoining frusto conical surfaces defining internal and external V shaped grooves and spaced apart surface portions at the apex of said V shaped grooves defining an expansion gap between said end portions;

inner and outer resilient metal annular ring sealing members each having a V shaped cross section defined between inner and outer V shaped surfaces and where an outer V shaped surface extends from an apex to outer edge surfaces at the end portions of an outer V shaped surface, said ring sealing members being sized for initial receipt in said V shaped grooves so that there is a V shaped spacing between said outer V shaped surfaces and said frusto conical surfaces in a relaxed condition of said ring sealing members and so that the outer edge surfaces of said ring sealing members engage said frusto conical surfaces in a preloaded and assembled condition of the coupling device whereby said outer edge surfaces on said ring sealing members can move longitudinally and radially to maintain contact with said frusto conical surfaces when said expansion gap varies in response to differential pressure across said coupling device;

retainer means on said coupling members for enclosing said ring sealing members in said V shaped grooves; and means for attaching said coupling members to one another with the outer edge surfaces of said ring sealing members in contact with said frusto conical surfaces and for preloading said ring sealing members between said coupling members.

10. A coupling device for tubular pipe members subjected to differential pressure, said coupling device including first and second metal tubular coupling members respectively with end portions arranged for a facing relationship where said end portions respectively having adjoining frusto conical surfaces defining a V shaped groove and spaced apart surface portions at the apex of said V shaped groove defining an expansion gap between said end portions;

a resilient metal annular ring sealing member having a V shaped cross section defined between inner and outer V shaped surfaces and where said outer V shaped surface extends from an apex to outer edge surfaces at the end portions of the outer V shaped surface, said ring sealing member being sized for initial receipt in said V shaped groove so that there is a V shaped spacing between said outer V shaped surface and said frusto conical surfaces in a relaxed condition of said ring sealing member and so that the outer edge surfaces of said ring sealing member engage said frusto conical surfaces in a preloaded and assembled condition of the coupling device whereby said outer edge surfaces of said ring sealing member can move longitudinally and radially to maintain contact with said frusto conical surfaces when said expansion gap varies in response to differential pressure across said coupling device;

retainer means in the bores of said coupling members for enclosing said ring sealing member in said V shaped groove;

means for coupling and uncoupling said coupling members relative to one another for preloading said ring sealing member when said coupling members are coupled relative to one another and for unloading said ring sealing member when said coupling members are uncoupled relative to one another;

said ring sealing member, in a relaxed condition prior to preloading, having an overall transverse dimension between the outer edge surfaces which is approximately twice the dimension of a radial distance extending between an outer edge surface and the outer apex of said ring sealing member and having in the transverse width of a base section between the inner and outer V shaped surfaces of the ring sealing member approximately one-half of the radial dimension between the inner and outer apexes of the inner and outer V shaped surfaces; and said coupling members having counterbores and said retainer means being a tubular member sized to provide a relatively continuous smooth cylindrical surface in the coupling members.

11. The coupling device as set forth in claim 10 wherein seal means are disposed between one of the counterbores and said tubular member.

12. The coupling device as set forth in claim 11 and further including complementarily arranged frusto conical engaging surfaces on said end portions where the engagement of said frusto conical engaging surfaces defines location of said spaced apart surface portions and the expansion gap between said end portions.

13. The coupling device as set forth in claim 10 and further including bearing means disposed between said attaching means and said coupling members for permitting relative rotation between said coupling members.

14. The coupling device as set forth in claim 13 and further including grease means for accessing lubricant to said bearing means.

15. A coupling device for tubular pipe members subjected to differential pressure, said coupling device including first and second metal tubular coupling members respectively with end portions arranged for a facing relationship where said end portions respectively have adjoining frusto conical surfaces defining a V shaped external groove and spaced apart surface portions at the apex of said V shaped groove defining an expansion gap between said end portions;

a resilient metal annular ring sealing member having a V shaped cross section defined between inner and outer V shaped surfaces where said outer V shaped surface extends from an apex to outer edge surfaces at the end portions of the outer V shaped surface, said ring sealing member being sized for initial receipt in said V shaped groove so that there is a V shaped spacing between said outer V shaped surface and said frusto conical surfaces in a relaxed condition of said ring sealing member and so that the outer edge surfaces of said ring sealing member engage said frusto conical surfaces in a preloaded and assembled condition of the coupling device whereby said outer edge surfaces of said ring sealing member can move longitudinally and radially to maintain contact with said frusto conical surfaces when said expansion gap varies in response to differential pressure across said coupling device;

retainer means in the bores of said coupling members for enclosing said ring sealing member in said V shaped groove;

means for coupling and uncoupling said coupling members relative to one another for preloading said ring sealing member when said coupling members are coupled relative to one another and for unloading said ring sealing member when said coupling members are uncoupled relative to one another;

said ring sealing member, in a relaxed condition prior to preloading, having an overall transverse dimension between the outer edge surfaces which is approximately twice the dimension of a radial distance extending between an outer edge surface and the outer apex of said ring sealing member and having a transverse width of a base section between the inner and outer V shaped surfaces of the ring sealing member of approximately one-half of the radial dimension between the inner and outer apexes of the inner and outer V shaped surfaces; and said coupling members have counterbores and said retainer means being a tubular member sized to provide a relatively continuous smooth cylindrical surface in the coupling members.

16. A coupling device for tubular pipe members subjected to differential pressure, said coupling device including first and second metal tubular coupling members respectively with end portions arranged for a facing relationship where said end portions respectively have adjoining frusto conical surfaces defining internal and external V shaped grooves and spaced apart surface portions at the apex of said V shaped grooves defining an expansion gap between said end portions;

resilient metal annular ring sealing members each having a V shaped cross section defined between inner and outer V shaped surfaces and where said outer V shaped surface extends from an apex to outer edge surfaces at the end portions of an outer V shaped surface, said ring sealing members being sized for initial receipt in said V shaped grooves so that there is a V shaped spacing between the outer V shaped surfaces and said frusto conical surfaces in a relaxed condition of said ring sealing members and so that the outer edge surfaces of said ring sealing members engage said frusto conical surfaces in a preloaded and assembled condition of the coupling device whereby said outer edge surfaces of said ring sealing members can move longitudinally and radially to maintain contact with said frusto conical surfaces when said expansion gap varies in response to differential pressure across said coupling device;

retainer means in said coupling members for enclosing said ring sealing members in said V shaped grooves;

means for coupling and uncoupling said coupling members relative to one another for preloading said ring sealing members when said coupling members are coupled relative to one another and for unloading said ring sealing members when said coupling members are uncoupled relative to one another;

said ring sealing members, in a relaxed condition prior to preloading, having an overall transverse dimension between the outer edge surfaces which is approximately twice the dimension for a radial distance extending between an outer edge surface and the outer apex of a ring sealing member and having a transverse width of a base section between the inner and outer V shaped surfaces of a ring sealing member of approximately one-half of the radial dimension between the inner and outer apexes of the inner and outer V shaped surfaces; and said coupling members respectively having counterbores and external recesses, said retainer means being tubular members received by said counterbores and said external recesses to provide relatively continuous smooth cylindrical surfaces along the coupling members.

17. A coupling device for tubular pipe members subjected to differential pressure, said coupling device including:

first and second metal tubular coupling members respectively with end portions arranged for a facing relationship where said end portions respectively have adjoining frusto conical surfaces defining a V shaped groove and spaced apart surface portions at the apex of said V shaped groove defining an expansion gap between said end portions;

a resilient metal annular ring sealing member having a V shaped cross section defined between inner and outer V shaped surfaces and where said outer V shaped surface extends from an apex to outer edge surfaces at the end portions of the outer V shaped surface, said ring sealing member having a low modulus of elasticity as compared to carbon steel being sized for initial receipt in said V shaped groove so that there is a V shaped spacing between said outer V shaped surfaces and said frusto conical surfaces in a relaxed condition of said ring sealing member and so that the outer edge surfaces of said ring sealing member engage said frusto conical surfaces in a preloaded and assembled condition of the coupling device whereby said outer edge surfaces of said ring sealing member can move longitudinally and radially to maintain contact with said frusto conical surfaces when said expansion gap varies in response to differential pressure across said coupling device;

means for attaching said coupling members to one another with the outer edge surfaces of said ring sealing member in contact with said frusto conical surfaces of said coupling members and for preloading said ring sealing members; and bearing means disposed between said attaching means and said coupling members for permitting relative rotation between said coupling members.

18. A coupling device for tubular pipe members subjected to differential pressure, said coupling device including first and second metal tubular coupling members respectively with end portions arranged for a facing relationship where said end portions respectively having adjoining frusto conical surfaces defining a V shaped groove and spaced apart surface portions at the apex of said V shaped groove defining an expansion gap between said end portions;

a resilient metal annular ring sealing member constructed from a material having a modulus of elasticity comparable to Inconel 718, said ring sealing member having a V shaped cross section defined between inner and outer V shaped surfaces where said outer V shaped surface extends from an apex to outer edge surfaces at the end portions of the outer V shaped surface, said ring sealing member being sized for initial receipt in said V shaped groove so that there is a V shaped spacing between said outer V shaped surface and said frusto conical surfaces in a relaxed condition of said ring sealing member and so that the outer edge surfaces of said ring sealing member engage said frusto conical surfaces in a preloaded and assembled condition of the coupling device whereby said outer edge surfaces of said ring sealing member can move longitudinally and radially to maintain contact with said frusto conical surfaces when said expansion gap varies in response to differential pressure across said coupling device; and means for attaching said coupling members to one another with the outer edge surfaces of said ring sealing member in contact with said frusto conical surfaces of said coupling members and for preloading said ring sealing member.

19. The coupling device as set forth in claim 18 and further including bearing means disposed between said attaching means and said coupling members for permitting relative rotation between said coupling members.

* * * * *